UNITED STATES PATENT OFFICE.

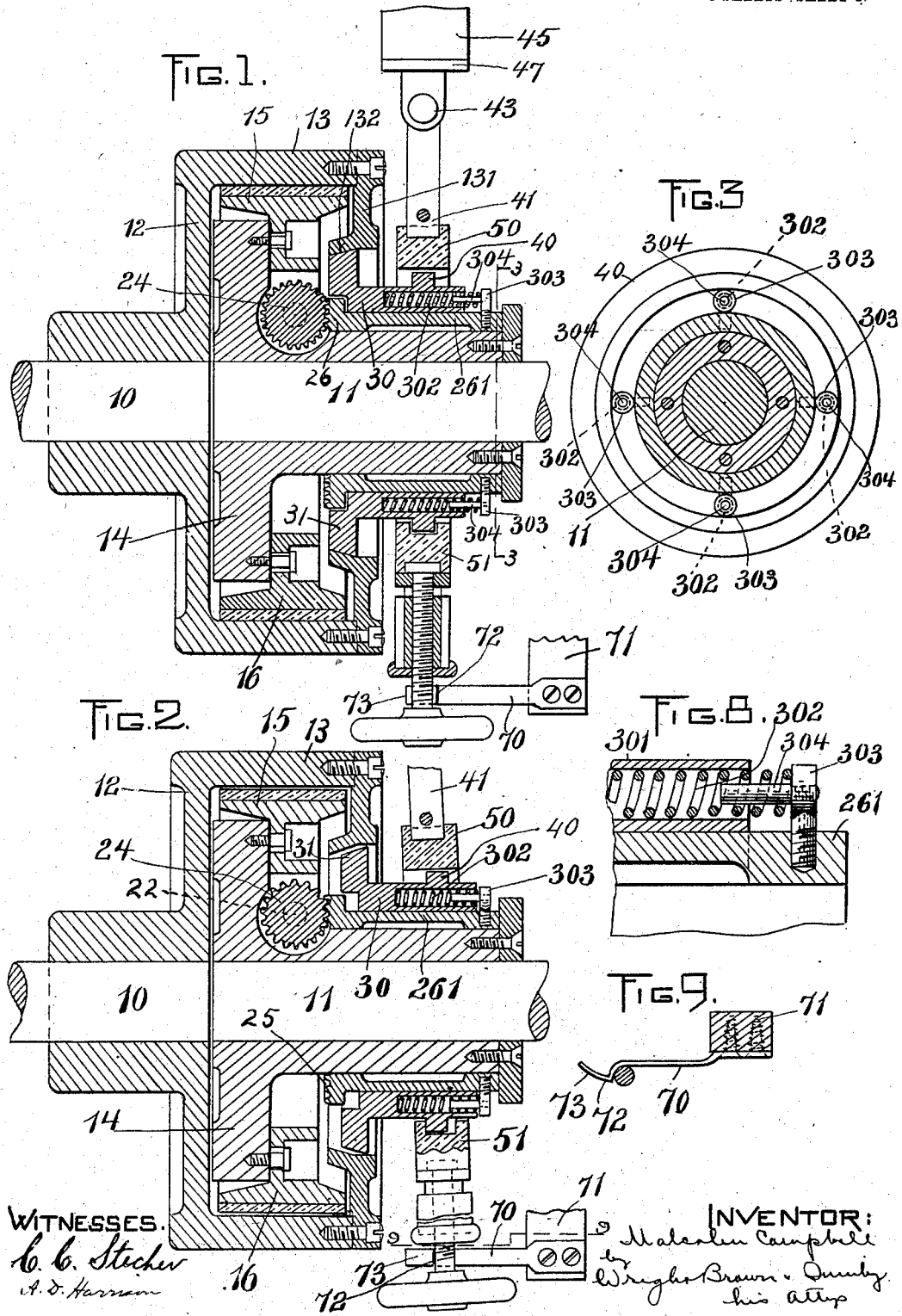

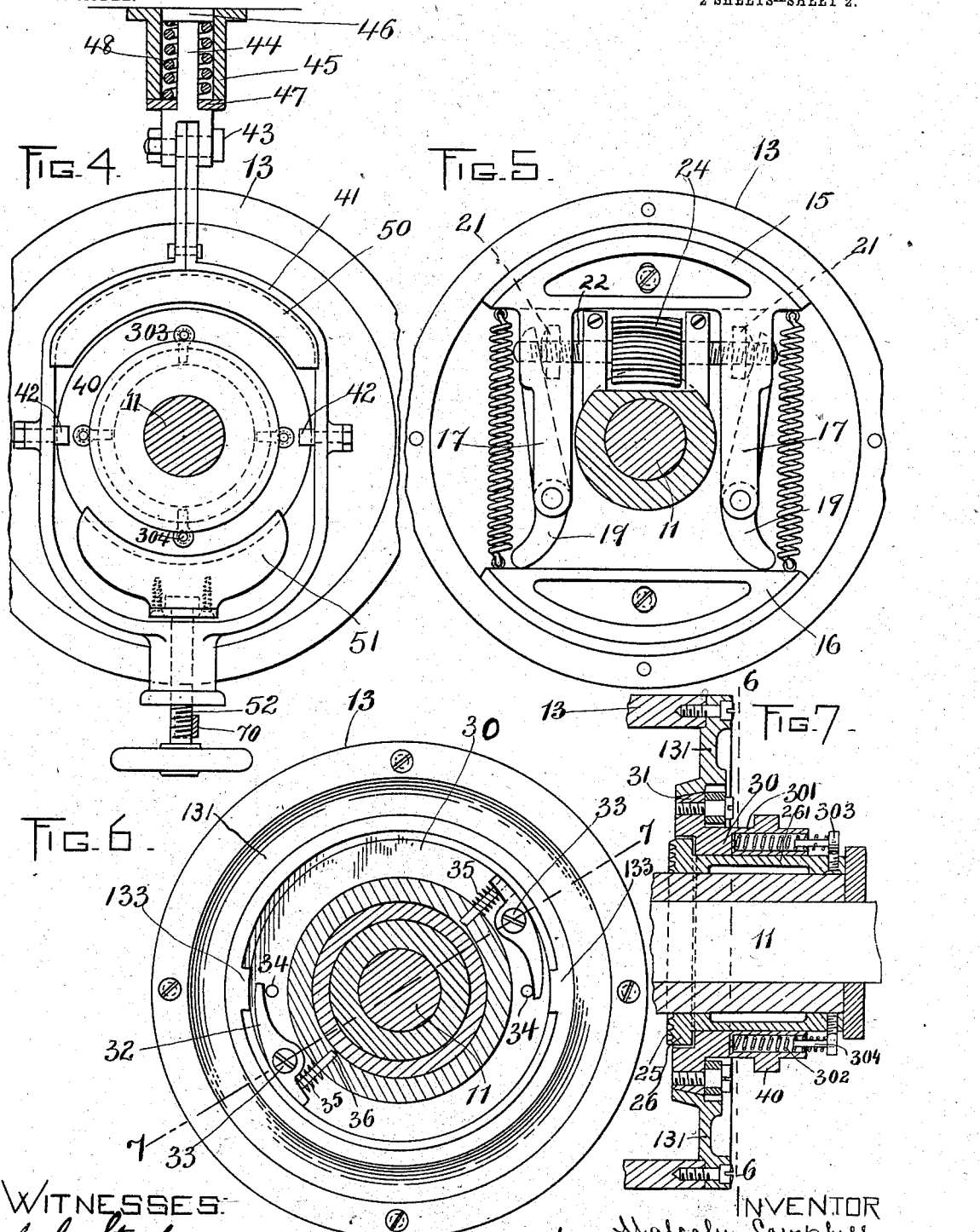

MALCOLM CAMPBELL, OF BOSTON, MASSACHUSETTS.

FRICTION-CLUTCH.

SPECIFICATION forming part of Letters Patent No. 719,993, dated February 10, 1903.

Application filed February 24, 1902. Serial No. 95,250. (No model.)

*To all whom it may concern:*

Be it known that I, MALCOLM CAMPBELL, of Boston, in the county of Suffolk and State of Massachusetts, have invented certain new and useful Improvements in Friction-Clutches, of which the following is a specification.

This invention has relation to friction-clutches of the type set forth in Letters Patent No. 686,923, granted to me November 19, 1901, and Letters Patent No. 699,447, granted to me May 6, 1901. In the said patents the clutch is described as being provided with a clutching member having two oppositely-movable shoes to engage a friction-surface on the other member and the worm and worm-wheel for transmitting movement to said shoes to force them into operative position. The particular clutch described in the later of said patents is provided with mechanism for first frictionally engaging the plate which carries the worm with the rotating clutch member to cause it to rotate at a certain speed at which the mechanism is actuated to positively clutch to worm-plate with the said rotating clutch member. Upon the hub of the worm-plate is mounted the axially-movable friction member to rotate therewith, and a lever is provided for moving the said member into and out of frictional engagement with the rotating clutch member.

The present invention comprises means by which the axially-movable friction member is held yieldingly in engagement with the rotating clutch member and latching mechanism, by means of which the said member may be withdrawn to and held in an inoperative position when it is desired that the parts should rotate freely.

Referring to the accompanying drawings, Figure 1 represents a longitudinal section through a clutch embodying the invention, the friction member being shown in an operative position. Fig. 2 represents a similar section, but shows the friction member in an inoperative position. Fig. 3 represents a section on the line 3 3 of Fig. 1. Fig. 4 represents an end view of a clutch mechanism. Fig. 5 represents a detail view of some of the parts, including the mechanism contained within the rotating clutch member, and showing the shoes and the lever mechanism for actuating them. Fig. 6 represents the positive clutching mechanism for connecting the worm-plate with the rotating clutch member, some of the parts being shown in section on the line 6 6 of Fig. 7. Fig. 7 represents a section on line 7 7 of Fig. 6. Fig. 8 represents in detail the yielding means for moving the friction member into operative position. Fig. 9 represents the latch for holding the said member in inoperative position, said figure being taken on line 9 9 of Fig. 2.

Referring to the said drawings, the driving-shaft 10 and the driven shaft 11 are in axial alinement, as shown. To the shaft 10 is rigidly secured the rotating clutch member, illustrated as a wheel 12 with a flanged rim 13. To the said rim is rigidly secured an inwardly-projecting flange 131, having a beveled friction-surface 132. The said flange is provided with two diametrically opposite teeth 133 to constitute an internal ratchet. Within the rim of the wheel 12 is placed the clutch member 14, keyed to the shaft 11. This clutch member carries the separable shoes 15 16, whose outer surfaces are adapted to make contact with the inner surface of the rim 13. The shoe 15 has the arms 17 17, in which are fulcrumed two levers 19 19. The free ends of said levers bear against the shoe 16, their inner ends bearing against nuts 21 21 on a screw-shaft 22. The arms 17 and the levers 19 are formed and relatively arranged substantially as set forth in Letters Patent No. 686,923, hereinbefore referred to.

The screw-shaft 22 carries a worm-wheel 24, with which is engaged a worm in the form of a spiral scroll 25 on the scroll-plate 26. The scroll-plate is on the end of a sleeve 261 and is loosely mounted on the hub of the member 14. Keyed upon the hub or sleeve 261 of the worm there is a sliding member 30. This member is formed with a flange 31, complemental to the friction-surface 132 on the member 12. The said friction member 30 is therefore adapted to be moved into frictional engagement with the rotating clutch member 13, so as to frictionally drive the worm and cause it to rotate the worm-wheel, and thereby force the shoes 15 16 into frictional engagement with the interior surface of the worm 13 of the clutch member 12.

For the purpose of locking the friction member 30 with the clutch member 12 I provide centrifugally-acting pawls or dogs, which are indicated at 32. Each dog is fulcrumed at one end upon a stud 33, secured to the member 30, and is normally held in an inoperative position against a pin 34 by an expansion-spring 35, coiled about the guide-pin 36, passing loosely through the end of a pawl. Under normal conditions the springs 35 hold the pawls in an inoperative position; but when the speed of the member 30 exceeds a certain number of revolutions per minute the longer ends of the dogs are thrown out by centrifugal action and caused to engage ratchet-teeth 133 of the rotating clutch member 12, whereupon the said members 30 and 131 are positively clutched together and are rotated in unison. This positive clutching of the two members causes the positive actuation or rotation of the worm and the worm-wheel until the shafts 10 and 11 are so firmly clutched together as to move in unison.

In order to unclutch the members, it is necessary to disengage the member 30 from the rotating clutch member 131 and to apply friction to the member 30. For this purpose on the hub of the friction member 30 is a circumferential flange 40. The hub 41 is formed with pins 42, which lie on either side of said flange. The upper end of the yoke is pivoted by the pintle 43 to a spindle 44, adapted to slide in a tubular guide 45, attached to some convenient stationary support. The spindle is formed on its end with a head 46, between which and a shoulder 47 on the guide is placed an expansion helical spring 48. This jointed connection permits the yoke to be swung in the direction of rotation of the shaft 11 to move the friction member into and out of frictional engagement with the friction-surface on the rotating clutch member. The yoke is formed with two friction-shoes 50 51, the former being rigidly secured to the top portion of the yoke and the latter being mounted upon the end of a screw-bar 52. The parts are so arranged and constructed that when the yoke is moved to disengage the friction member 30 from the rotating clutch member 12 the screw-bar 52 may be rotated to cause the friction-shoes to engage the periphery of the flange 40 and hold the friction member 30 and the worm 26 against rotation.

As thus far described the mechanism and the operation thereof do not differ from that disclosed in my said patent of May 6, 1902, and I will now describe the features of the present invention, which provides means for yieldingly throwing the axially-movable friction member 30 into operative position except when held outward or in an inoperative position by the latch.

It will be observed that the friction member 30 is provided with a plurality of sockets 301, which extend parallel to the axis of said member. In each socket is placed a spring 302, which bears against a screw-pin 303, secured in the hub 261 of the worm-plate. Each pin is provided with a small guide 304 to prevent the removal of the spring 302. The function of these springs is to hold the axially-movable friction member yieldingly in engagement with the rotating clutch member, so that if by chance the positive clutch mechanism which connects the member with the rotating clutch member should become disengaged the frictional engagement of the said member with the rotating clutch member will so connect the parts as to cause them to rotate together until the positive clutching-dogs 32 are again thrown out in such position as to engage the internal ratchet on the normally rotating clutch member.

To hold the friction member in inoperative position, I provide a latch 70, secured to a suitable stationary support 71. This latch is preferably formed of spring metal and is provided at its end with a hook 72, which is beveled, as at 73. When the yoke is moved to the position shown in Fig. 2, the screw-bar is engaged by the hook 72 and the yoke is held in that position with the friction member 30 out of contact with the normally rotating clutch member 13. By thrusting the latch so as to disengage it from the screw-bar 52 the friction member 30 is forced by the springs into contact with the rotating clutch member.

Having thus explained the nature of the invention and described a way of constructing and using the same, although without attempting to set forth all of the forms in which it may be made or all of the modes of its use, I declare that what I claim is—

1. A clutch comprising a normally rotating clutch member having two friction-surfaces, a member having friction mechanism to engage one of said surfaces, a worm for actuating said mechanism, a member in sliding engagement with said worm and provided with means for frictionally engaging the other surface of said normally rotating clutch member, and a latch adapted to hold said sliding member in an inoperative position.

2. A clutch comprising a normally rotating clutch member having two friction-surfaces, a member having friction mechanism to engage one of said surfaces, a worm for actuating said mechanism, a member in sliding engagement with said worm and provided with means for frictionally engaging the other surface of said normally rotating clutch member, and yielding means for normally holding said sliding member in said described engagement with said normally rotating clutch member.

3. A clutch comprising a normally rotating clutch member having two friction-surfaces, a member having friction mechanism to engage one of said surfaces, a worm for actuating said mechanism, a member in sliding engagement with said worm and provided with means for frictionally engaging the other surface of said normally rotating clutch member, yielding means for normally holding said sliding member in said described engagement with said normally rotating clutch member, and a latch adapted to hold said sliding member in an inoperative position against the stress of said yielding means.

4. A clutch comprising a normally rotating clutch member, a second member having friction mechanism for engaging the normally rotating member, a third member having means adapted to be actuated by said normally rotating clutch mechanism, connections intermediate said second and third members for actuating the said friction mechanism, and means for yieldingly maintaining said third member in frictional engagement with said normally rotating clutch member.

In testimony whereof I have affixed my signature in presence of two witnesses.

MALCOLM CAMPBELL.

Witnesses:
C. F. BROWN,
C. C. STECHER.